United States Patent Office 3,082,239
Patented Mar. 19, 1963

3,082,239
THIOPHOSPHORIC ACID ESTERS AND PROCESS FOR THEIR PRODUCTION
Rudolf Mühlmann, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Apr. 21, 1960, Ser. No. 23,647
Claims priority, application Germany Apr. 29, 1959
3 Claims. (Cl. 260—461)

The present invention relates to and has as its objects useful insecticidal thiophosphoric acid esters and a new process for their production. Generally the compounds of this invention may be represented by the following formula

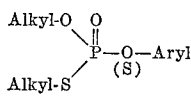

It has been found that these compounds may be obtained from O.S-dialkyl-thiophosphoric acid halides by esterification with any phenols or with any aryl mercaptans. In this way the above insecticidal compounds are formed which hitherto were obtainable by conventional methods only with very great difficulty i.e. by thermal re-arrangement of the corresponding thionoesters.

The intermediates used for the inventive process, i.e. the O.S-dialkyl-thiophosphoric acid halides especially chlorides may be obtained from O.S-dialkyl-phosphoric acids or their alkali salts by reaction with phosphorus pentachloride. Unexpectantly during this reaction the alkyl thio ester group is not replaced by phosphorus pentachloride or changed by phosphorus hydroxychloride. Usually thiolphosphoric acid esters already in the cold are split into mercaptans and phosphoric acid esters.

The reaction of these O.S-dialkyl-thiophosphoric acid halides with phenols or aromatic mercaptans is carried out preferably in inert organic solvents such as alcohols, ketones, benzene, toluene and the like and at temperatures between about room temperature and the boiling point of the solvent used. The reaction either may be carried out with phenolates or mercaptides especially of alkali metals or of ammonia. It is not necessary, however, to prepare these salts before the reaction, they also may be formed in the solvent before the reaction or during the reaction.

A special advantage of the inventive process is the fact that O.S-dialkyl thiophosphoric acid ethyl esters are obtained in very good yields and high purity whereas to previously known methods i.e. re-arrangement of corresponding thiono-esters only impure and unsufficient quantities of compounds are obtained.

Compared with known O.O-dialkyl-thionophosphoric aryl esters the new compounds obtainable according to this invention are distinguished by a somewhat improved activity. Moreover, some of the compounds obtainable according to the invention possess a remarkable activity against pests which are resistant against known phosphoric acid ester pesticides.

The thiophosphoric acid esters obtainable according to the invention are applied in a manner known in principle i.e. preferably in combination with suitable solid or liquid extending of diluting agents, if desired, with the concurrent use of suitable commercial emulsifiers.

The following examples are given for the purpose of illustrating the present invention.

Example 1

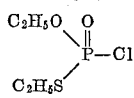

48 grams of O.S-diethyl-thiophosphoric acid sodium salt are introduced while stirring in a suspension of 52 grams of phosphorus penta-chloride in 50 ml. of carbon tetrachloride. By external cooling the internal temperature has been kept below 30° C. After the reaction is finished stirring is continued while the temperature is allowed to rise to 35° C. After distilling the crude mixture the above compound is obtained in an amount of 30 grams distilling at 2 mm. Hg at 59 to 62° C. The yield amounts to 64% of the theoretical.

Example 2

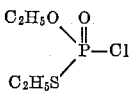

85 grams of O.S-diethyl-thiophosphoric acid are dissolved in 100 ml. of carbon tetrachloride. Into this solution there are introduced while cooling and stirring 104 grams of phosphorus penta-chloride. The temperature is kept at 30° C. until the phosphorus penta-chloride has disappeared. While fractionating the reaction product there are obtained 70 grams of O.S-diethyl-thiophosphoric acid chloride distilling at 2 mm. Hg at 58–62° C. Yield 64% of the theoretical.

Example 3

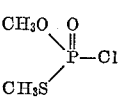

82 grams of the sodium salt of O.S-dimethyl-thiophosphoric acid are dissolved in 350 ml. of benzene. While cooling and stirring there are added during 20 minutes 105 grams of phosphorus penta-chloride. The reaction proceeds exothermic and sodium chloride separates. Stirring is continued at 30° C. for 1 hour. The sodium chloride is removed by filtration with suction. After distilling off the solvent there are obtained 78 grams of the above compound distilling at 2 mm. Hg at 58° C. corresponding to 97.5% of the theoretical.

Example 4

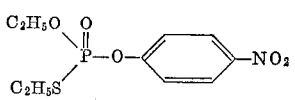

18.8 grams ($\frac{1}{10}$ mol) of O.S-diethyl-thiophosphoric acid chloride (B.P. 59–62° C./2 mm. Hg) are dissolved in 20 cc. of acetone. This solution is added with stirring and slight cooling to a suspension of 25 grams of sodium-p-nitrophenate in 20 cc. of acetone. The mixture is stirred at room temperature for about one hour and the reaction is interrupted when a sample of the reaction product shows no further acid reaction on a moist filter paper. The reaction product is placed in 200 cc. of ice-water. The separated oil is taken up in 300 cc. of benzene. The benzene solution is washed several times with a 10% sodium solution and then with water. The benzene solution is dried with sodium sulfate and subsequently fractionated. 21 grams of O.S-diethyl-phosphoric acid-p-nitrophenyl ester of B.P. 102° C./0.01 mm. Hg are obtained in this way. Yield 71% of the theoretical. The new ester shows on rats per os a toxicity of 20–25 mg./kg. $LD_{50}$. A $10^{-6}$ molar aqueous solution inhibits cholinesterase to about 50%.

By exactly the same way there may be obtained the following compounds:

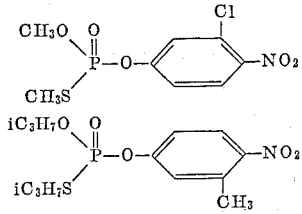

By using instead of sodium-p-nitrophenate the corresponding equimolecular amount of p-nitro-phenyl mercaptan in the presence of the necessary amount of sodium alcoholate there is obtained the following compound:

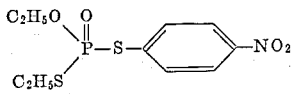

With other corresponding substituted phenyl mercaptans there may be obtained the following compounds:

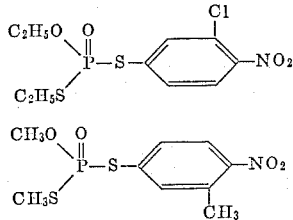

We claim:

1. Process for the production of a phosphoric acid ester of the following formula

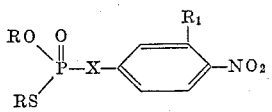

in which R stands for a lower alkyl radical up to 4 carbon atoms, $R_1$ stands for a member selected from the group consisting of lower alkyl radicals up to 4 carbon atoms and chlorine, and X stands for a member selected from the group consisting of oxygen and sulfur, which comprises (1) contacting a compound of the formula

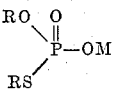

wherein R has the same significance set out above and M is a member selected from the group consisting of H and an alkali cation, with phosphorus pentachloride and (2) contacting resultant O,S-dialkyl-thiol-phosphoric acid chloride with a compound of the formula

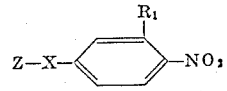

wherein $R_1$ and X have the same significance set out above, and Z is a member selected from the group consisting of H, an alkali cation and $NH_4$.

2. The process of claim 1 wherein the second step is carried out in the presence of an inert organic solvent.

3. A process for the production of a phosphoric acid compound of the following formula

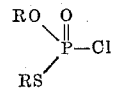

in which R stands for a lower alkyl radical having up to 4 carbon atoms, which comprises contacting a compound of the formula

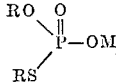

wherein R has the same significance set out above and M is a member selected from the group consisting of H and an alkali cation, with phosphorus pentachloride.

References Cited in the file of this patent
UNITED STATES PATENTS

| | | |
|---|---|---|
| 2,679,508 | Gysin | May 25, 1954 |
| 2,861,876 | Birum | Nov. 25, 1958 |
| 2,881,201 | Schrader | Apr. 7, 1959 |

FOREIGN PATENTS

| | | |
|---|---|---|
| 257,649 | Switzerland | May 2, 1949 |
| 814,152 | Germany | Sept. 20, 1951 |
| 1,137,159 | France | Jan. 7, 1957 |
| 806,148 | Great Britain | Dec. 17, 1958 |

OTHER REFERENCES

Kosolapoff: "Organophosphorus Compounds," John Wiley and Sons, New York (1950), page 217.